US008718809B2

(12) United States Patent
Baseman et al.

(10) Patent No.: US 8,718,809 B2
(45) Date of Patent: May 6, 2014

(54) COMPREHENSIVE ANALYSIS OF QUEUE TIMES IN MICROELECTRONIC MANUFACTURING

(75) Inventors: Robert J. Baseman, Brewster, NY (US); Tomasz J. Nowicki, Fort Montgomery, NY (US)

(73) Assignee: International Business Machines Corporation, Armonk, NY (US)

( * ) Notice: Subject to any disclaimer, the term of this patent is extended or adjusted under 35 U.S.C. 154(b) by 1029 days.

(21) Appl. No.: 12/778,457

(22) Filed: May 12, 2010

(65) Prior Publication Data

US 2011/0282472 A1    Nov. 17, 2011

(51) Int. Cl.
*G06F 19/00* (2011.01)

(52) U.S. Cl.
USPC ............ 700/100; 700/103; 700/115; 700/121

(58) Field of Classification Search
USPC .................................. 700/100, 103, 115, 121
See application file for complete search history.

(56) References Cited

U.S. PATENT DOCUMENTS 6,800,494 B1    10/2004    Castle et al.
7,085,612 B2 *   8/2006    Liu et al. .......................... 700/91
7,623,936 B1 *  11/2009    Qu et al. ......................... 700/101
8,005,560 B2 *   8/2011    Rawlins et al. ............... 700/100
8,285,409 B2 *  10/2012    Ghosh et al. .................. 700/100

OTHER PUBLICATIONS

Higgins, J., Ed.D., "The Radical Statistician: Unleashing the Power of Applied Statistics in the Real World", Chapter 2, 2005.
Chen, H., et al., "Domain Splitting Algorithm for Mixed Finite Element Approximations to Parabolic Problems," East-West J. Numer. Math., 1994, vol. 1, No. 1.
Aslam, J. A., et al., "The Star Clustering Algorithm for Static and Dynamic Information Organization," Journal of Graph Algorithms and Applications, 2004, vol. 8, No. 1, pp. 95-129.
Office Action dated Aug. 27, 2013, received in a related U.S. Appl. No. 13/604,986.

* cited by examiner

*Primary Examiner* — Ronald Hartman, Jr.
(74) *Attorney, Agent, or Firm* — Scully, Scott, Murphy & Presser, P.C.; Daniel P. Morris, Esq.

(57) ABSTRACT

A system for determining a group of semiconductor manufacturing process steps with a similar influence on individual semiconductor products. The system generates a first table including time stamps for the individual semiconductor products. The system creates a second table including Q-times based on the first table. The Q-times refers to time differences between every pair of the time stamps. The system forms a dependency table by grouping the Q-times with similar dependencies together. The system identifies groups of the similar dependencies. The system extracts semiconductor process steps belonging to the groups.

25 Claims, 6 Drawing Sheets

500

|         | Process step 1 | Process step 2 | Process step 3 | ... |
|---------|----------------|----------------|----------------|-----|
| Wafer 1 | 12:10:10       | 12:11:10       | 12:12:15       | ... |
| Wafer 2 | 12:12:12       | 12:13:14       | 12:14:20       | ... |
| ⋮       | ⋮              | ⋮              | ⋮              | ⋮   |

|         | Q-time 1    | Q-time 2    | ... |
|---------|-------------|-------------|-----|
| Wafer 1 | 1 min       | 1 min 5 sec | ... |
| Wafer 2 | 1 min 2 sec | 1 min 6 sec | ... |
| ⋮       | ⋮           | ⋮           | ⋮   |

FIG. 6

COMPREHENSIVE ANALYSIS OF QUEUE TIMES IN MICROELECTRONIC MANUFACTURING

BACKGROUND

The present application generally relates to manufacturing semiconductor products. More particularly, the present application relates to determining a group of semiconductor manufacturing process steps with a similar influence on individual semiconductor products.

A semiconductor product includes, but is not limited to a semiconductor chip, a semiconductor wafer, and a semiconductor wafer lot. A similar influence of queue time ("Q-time") on individual semiconductor products includes, but is not limited to increasing or decreasing leakage current, increasing or decreasing threshold voltage, increasing or decreasing areas of the semiconductor products, increasing or decreasing operational frequencies of the semiconductor products, etc. Q-time refers to the time spent for a semiconductor product to wait between individual semiconductor manufacturing processes. Maintaining high manufacturing yields and precise product quality control are of utmost importance in a commercial manufacture (e.g., IBM®, etc.) of semiconductor products. Unfortunately, an extraordinary sophistication of individual fabrication processes and an extreme complexity of an overall integrated fabrication process present myriad mechanisms for defects to be introduced which may degrade semiconductor product performance or render a semiconductor product non-functional. Thus, manufacturing yields are frequently lower than desired and product performance distributions are wider than desired.

A vast scale and scope of defect generating mechanisms also lead to extreme difficulties in diagnosing a source of defects, and many defects in semiconductor product manufacturing processes go undiagnosed. For example, a traditional diagnostic procedure may attempt a full evaluation of entire parameters (e.g., leakage current, capacitance, frequency, area, etc.) in an entire semiconductor manufacturing process. However, any such attempt may involve an impossible amount of data and combinatorially growing dependence structures (e.g., data dependency). Thus, to reduce the amount of computation, typical diagnostic or monitoring methods focus on specific subsets of production data such as production logistics and/or process trace data. An example of production logistics data is that a semiconductor wafer "X" in a semiconductor lot "Y" at time "T1" entered a chamber "C" in a semiconductor manufacturing tool "A" where a semiconductor manufacturing process "P" following a recipe "R" was performed as a semiconductor manufacturing step "S" until time "T2". Examples of the trace data include, but are not limited to chamber pressure, chamber temperature, and chamber atmosphere composition.

Q-time can vary widely in a semiconductor manufacturing environment, reflecting different line loading and tool availabilities. Significant product defects can be associated with the queue times between particular process steps in the semiconductor manufacturing process. For example, epitaxial thin film growth can be influenced by a pre-clean to deposition queue time, as a result of an uncontrolled growth of native oxides, especially on sidewalls. Back end metallization can suffer serious corrosion if a post-polish queue time is not maintained below a critical threshold. Migration of RIE (Reactive Ion Etching) induced contamination from photoresist is observed if an etch to strip queue time is not controlled.

Traditionally, the discovery of these effects (i.e., Q-time effects on semiconductor manufacturing process) has been a result of a painstaking ad-hoc investigation of otherwise unexplainable aberrant manufacturing results. Typically, it is difficult to anticipate an impact of queue times on some semiconductor manufacturing processes now in development. Traditionally, when discovered and adequately explored the Q-time effects, manufacturing line controls are introduced to assure semiconductor manufacturing processes take place within acceptable queue time windows.

Typical semiconductor manufacturing lines may include several thousands of steps, representing as many as 1,000,000 queue times. While the queue times between some particular steps are known to be critical, in general, product quality is not expected to be a sensitive function of queue time. These two factors (i.e., queue times and the product quality) contribute to a status quo in semiconductor product manufacturing. By analyzing or monitoring the semiconductor manufacturing process, the impact of queue time on product quality and/or manufacturing yields can be obtained, e.g., identifying pairs or groups of semiconductor manufacturing process steps with dependent (i.e., correlated) Q-times, and hence pointing to a group of steps with a possible influence on the product quality.

SUMMARY OF THE INVENTION

The present disclosure describes a system, method and computer program product for determining a group of semiconductor manufacturing process steps with a similar influence on individual semiconductor products.

In one embodiment, there is provided a system for determining a group of semiconductor manufacturing process steps with a similar influence on individual semiconductor products. The system comprises a memory device and a processor being connected to the memory device. The processor obtains a first table including time stamps of the manufacturing process steps for the individual semiconductor products. The processor creates a second table including Q-times based on the first table. The Q-times refers to time differences between every pair of the time stamps. The processor forms a dependency table by grouping the Q-times with similar dependencies together. The processor identifies groups of the similar dependencies. The processor extracts semiconductor process steps belonging to the groups.

In a further embodiment, the dependency table includes a multi-modal character. The multi-modal character refers to a graph or histogram of a distribution of a correlation having at least two distinct maxima.

In a further embodiment, the processor clusters the Q-times into the groups of similar dependency measures.

In a further embodiment, the similar dependency measure includes similar correlation coefficients.

BRIEF DESCRIPTION OF THE DRAWINGS

The accompanying drawings are included to provide a further understanding of the present invention, and are incorporated in and constitute a part of this specification.

FIG. 5 illustrates an example of the first table in one embodiment.

FIG. 6 illustrates an example of the second table in one embodiment.

DETAILED DESCRIPTION

Figure 1:
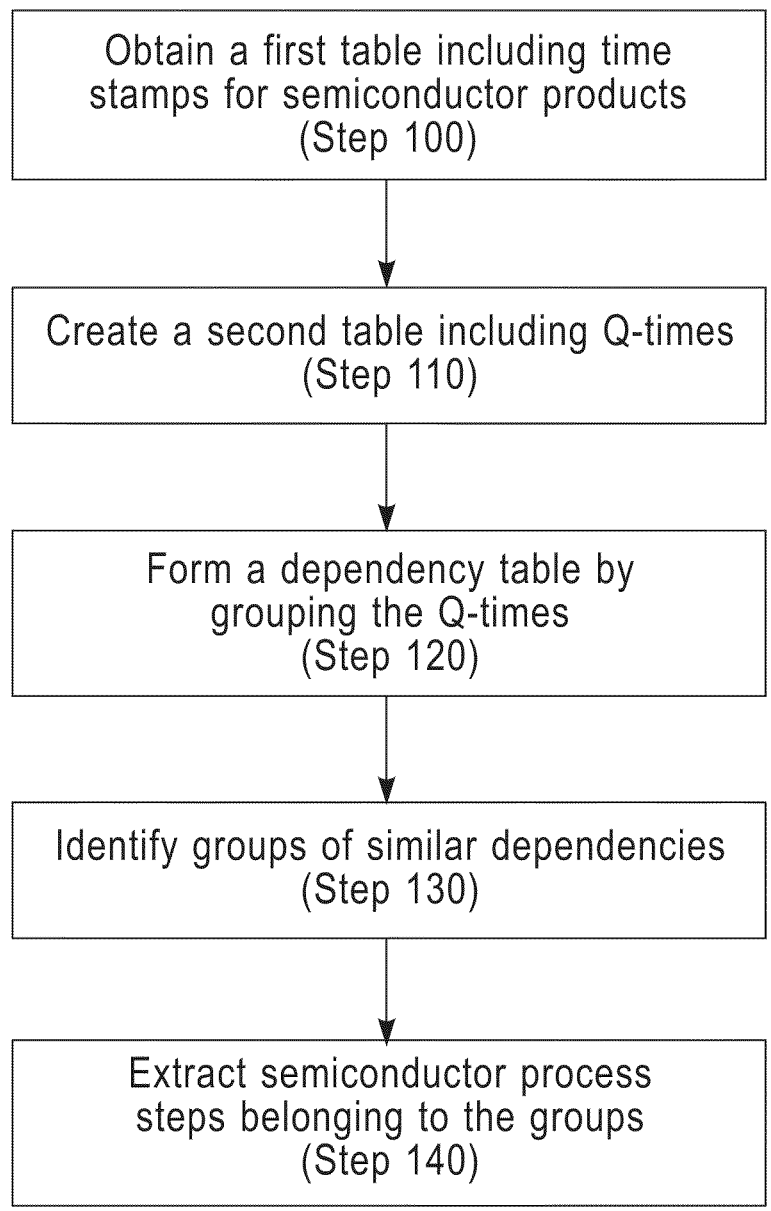
FIG. 1 illustrates a flow chart illustrating method steps for determining a group of semiconductor manufacturing process steps with a similar influence on individual semiconductor products according to one embodiment.

FIG. 1 illustrates a flow chart illustrating method steps for determining a group of semiconductor manufacturing process steps with a similar influence on individual semiconductor products in one embodiment. At step 100, a computing system (e.g., a computing system 200 in FIG. 2) including at least one memory device and at least processor device obtains a first table including time stamps for semiconductor products marking their process steps in a semiconductor manufacturing process. In one embodiment, there is provided a database (not shown). The processor retrieves the first table from the database. FIG. 5 illustrates an example of the first table. In this exemplary first table 500 illustrated in FIG. 5, "wafer 1" finishes a first semiconductor manufacturing step ("Process step 1") at 12:10:10 PM on a particular day. The "wafer 1" finishes a second semiconductor manufacturing step ("Process step 2") at 12:11:10 PM on the particular day. The "wafer 1" finishes a third semiconductor manufacturing step ("Process step 3") at 12:12:15 PM on the particular day. Although FIG. 5 illustrates two wafers and three semiconductor manufacturing steps, there may be a plurality of entries for a plurality of semiconductor products and/or a plurality of semiconductor manufacturing steps.

At step 110, the processor creates a second table including Q-times based on the first table. As described above, Q-times refer to time differences between every successive pair of the time stamps. Thus, the second table includes entries describing the time differences between every successive pair of the time stamps. A successive pair of steps refers to one step ("first step") after the other step ("second step"). There may be other steps between the first step and the second step. The second step may not be directly after the first step, vice versa. For example, FIG. 6 illustrates an example of the second table. The processor generates this exemplary second table 600, e.g., by calculating the time difference between successive time stamps described in the table 500. Thus, in this exemplary second table 600, "Q-time 1" (i.e., the time difference between the process step 1 and the process step 2) of the "wafer 1" is 1 min, i.e., 12:11:10−12:10:10=1 min. Similarly, "Q-time 2" (i.e., the time difference between the process step 2 and the process step 3) of the "wafer 2" is 1 min 5 sec, i.e., 12:12:15−12:11:10=1 min 5 sec. Although FIG. 6 illustrates two wafers and three Q-times, there may be a plurality of entries for a plurality of semiconductor products and/or a plurality of Q-times. Returning to FIG. 1, at step 120, the processor forms a dependency table, e.g., by grouping the Q-times with similar dependencies together. In one embodiment, a dependency includes, but is not limited to a correlation between Q-times or groups of Q-times. In one embodiment, the Q-times affect characteristics (e.g., leakage current, threshold voltage, etc.) of semiconductor products associated with the Q-times. In another embodiment, groups of Q-times affect characteristics of semiconductor products associated with the groups. A correlation refers to a degree of association between two random variables (e.g., two different Q-times). Usually, a correlation is measured by a correlation coefficient that ranges from −1 (never occur together) through 0 (definitely independent) to 1 (always happen together). (See Jim Higgins, Ed. D., Chapter 2 in "The Radical Statistician: Unleashing The Power Of Applied Statistics In The Real World, 2005, wholly incorporated by reference as if set forth herein, describing how to determine correlation and correlation coefficient in detail.)

In one embodiment, the dependency table includes a multi-modal character. A multi-modal character refers to a graph or histogram of a distribution of a correlation having at least two distinct maxima. In a histogram or a density of a distribution, maxima represents the most (locally) probable values while minima represent the most (locally) improbable values. In other words, the minima are the spots where a separation of the distribution occurs while the maxima are the spots where the mean of the distribution occurs (approximately). For example, an "M" shape curve is a bimodal distribution. In a further embodiment, the dependency table is a multimodal distribution. The dependency table includes, but is not limited to independent samples whose correlation coefficients have unimodal distributions, and dependent samples whose shapes change toward heavier or lighter tails. A unimodal distribution is similar to Gaussian distribution. These dependent samples may imply an extra structure (e.g., an unintended wall in a semiconductor product) and may be a possible source of information (e.g., causes of performance degradation in a semiconductor product).

Figure 3:
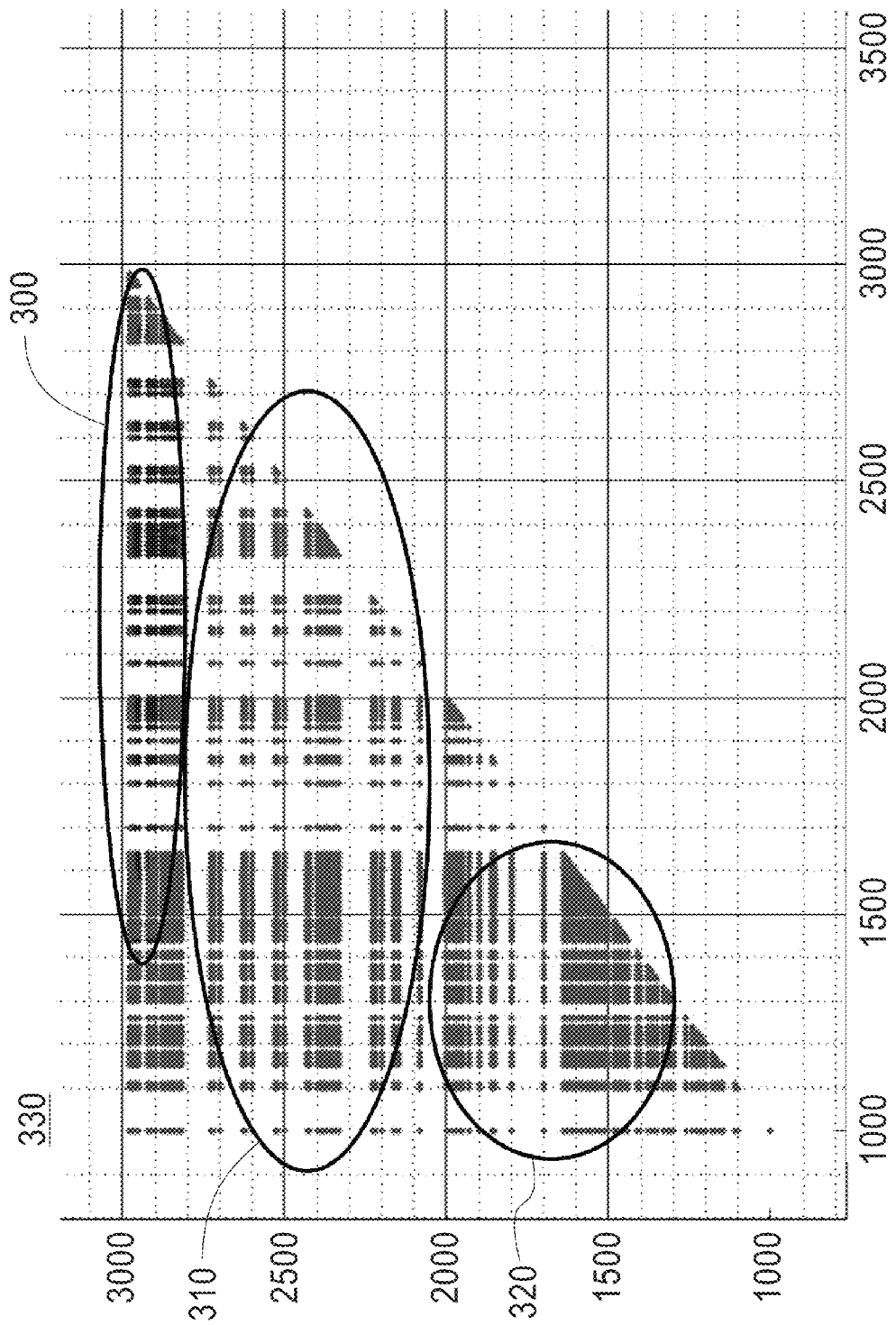
FIG. 3 illustrates an exemplary 2-D (two dimensional) dependency table in one embodiment.
Figure 4:
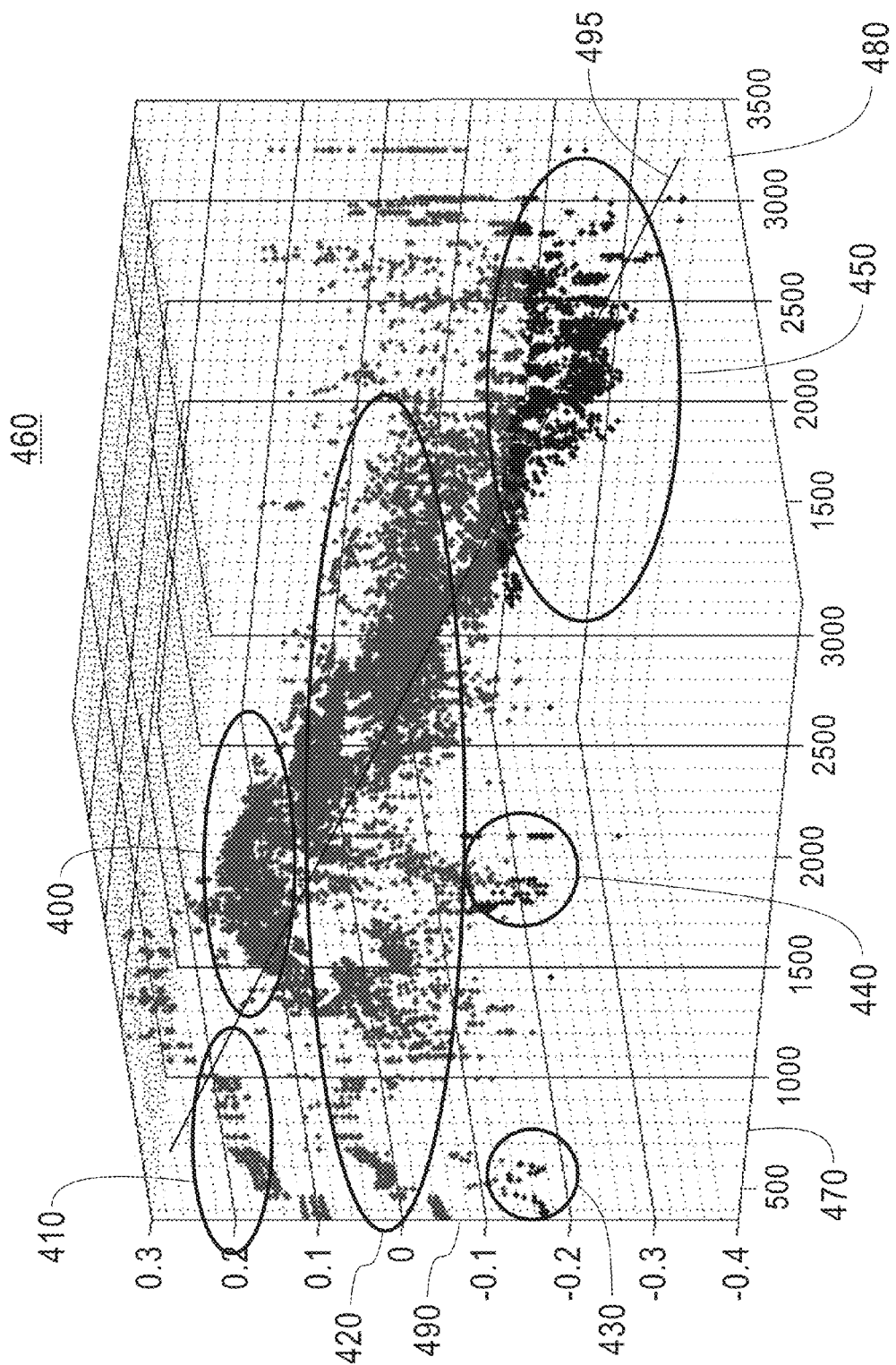
FIG. 4 illustrates an exemplary 3-D (three dimensional) dependency table in one embodiment.

FIGS. 3-4 illustrate exemplary dependency tables in one embodiment. FIG. 3 illustrates an exemplary 2-D dependency table 330. The table 330 demonstrates correlations between Q-times quantized into three groups (a first group 300, a second group 310 and a third group 320) of similar correlation coefficients. In one embodiment, the processor obtains the Q-times from the second table created at step 110. Each row of the table 330 is a specific Q-time. Each column of the table 330 is a specific Q-time. Each element of the table is a correlation coefficient between such two Q-times represented by a series of measurements (leakage current, threshold voltage, etc.) for many semiconductor products. In the table 330, the group 300 represents low, negative correlation coefficients (e.g., −0.5). The group 320 represents high, positive correlation coefficients (e.g., +0.5). The group 310 represents correlation coefficients close to zero. Similarly, FIG. 4 illustrates a 3-D exemplary dependency table 460. "X" axis 470 and "Y" axis 480 of the table 460 are specific Q-times. "Z" axis 490 of the table 460 represents values of correlation coefficients. In the table 460, groups 430-450 represent low, negative correlation coefficients. Groups 400-410 represent high, positive correlation. Group 420 represents correlation coefficients close to zero. The "X" axis 470, "Y" axis 480 and "Z" axis 490 refer to known coordinate axes in Cartesian coordinate system.

Returning to FIG. 1, at step 130, the processor forms a third table (e.g., a 2-D, triangular table, etc.) with entries corresponding to the correlation coefficients and Q-times of the semiconductor manufacturing process. The processor identifies groups of similar dependencies. In one embodiment, to identify the groups of similar dependencies, the processor clusters Q-times in the second table into groups of similar dependency measures, e.g., by using a splitting algorithm and/or clustering algorithm. This clustering reduces data (e.g., Q-times) to be analyzed to subsets of the data, e.g., by isolating the groups of semiconductor process steps with similar dependencies. In a further embodiment, a user (e.g., an engineer) may investigate the isolated groups to determine a physical cause (e.g., a dust in semiconductor manufacturing process, etc.) of a change in characteristics of the semiconductor products associated with the isolated groups. In one embodiment, the process focuses on a subspace of production logistics data with an application to temporary parametric device degradation (e.g., an increase of leakage current in a low nFET device, etc). A similar dependency measure includes, but is not limited to a similar correlation coefficient. For example, a first correlation coefficient whose value is 0.45 and a second correlation coefficient whose values is 0.40 may be two similar correlation coefficients. Javed A. Aslam, et al., "The Star Clustering Algorithm for Static and Dynamic Information Organization," Journal of Graph Algorithms and Applications, vol. 8, no. 1, pp. 95-129, 2004, wholly incorporated by referenced as if set forth herein, describes a clustering algorithm in detail. Chen, et al., "Domain Splitting Algorithm for Mixed Finite Element Approximations to Parabolic Problems," East-West J. Numer. Math. Vol. 1, No. 1, 1994, wholly incorporated by referenced as if set forth herein, describes a splitting algorithm in detail. In a further embodiment, there is provided a customized splitting algorithm. This customized splitting algorithm assumes that a distribution is a composition of several normal distributions. This customized splitting algorithm finds the number of components (e.g., groups of similar dependencies) and their parameters (e.g., similar correlation coefficients) by best fitting to experimental data (e.g., samples or Q-times).

Figure 7:
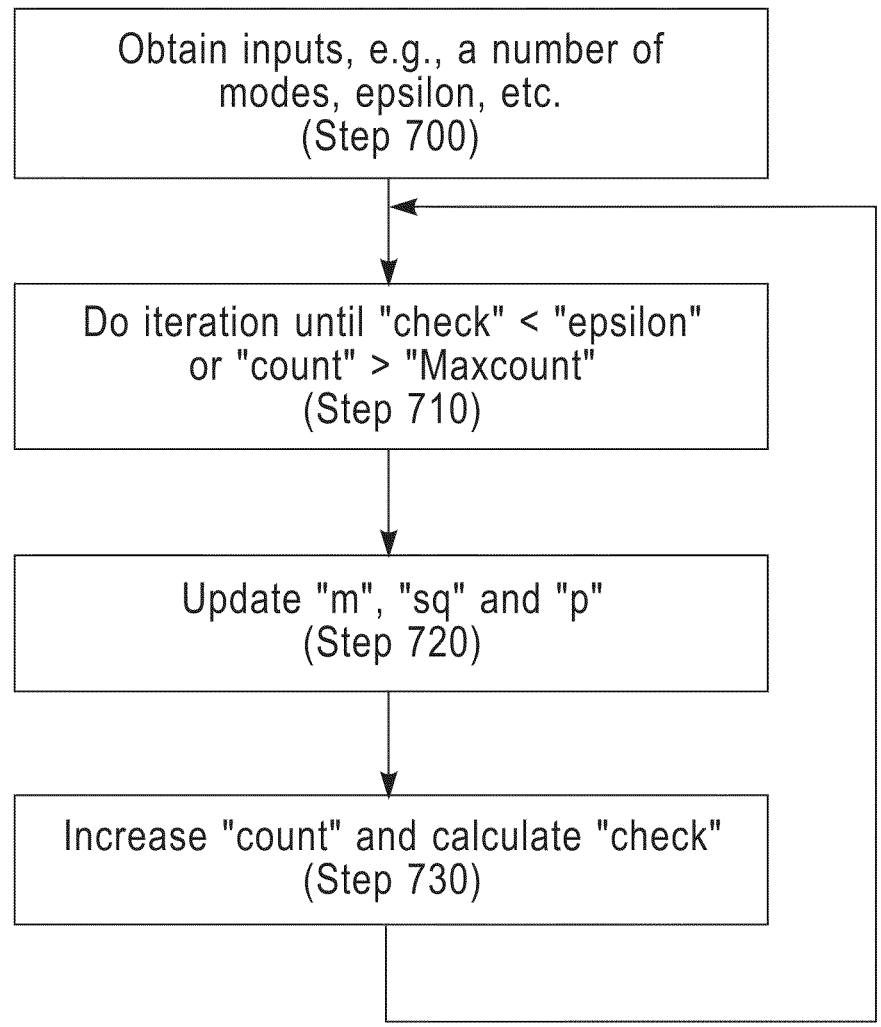
FIG. 7 illustrates an exemplary splitting algorithm in one embodiment.

FIG. 7 illustrates an exemplary splitting algorithm in one embodiment. At step 700, a computing system (e.g., a computing system 200 in FIG. 2) receives a vector of real numbers "data" of length "D" as an input. The computing system receives a number of modes "M" (for example, a default value M=2) as an input. The computing system receives an acceptable tolerance value "epsilon" (for example, a default value epsilon=1) and a maximal number of iterations "Maxcount" (for example, a default value Maxcount=100) as inputs. The computing system receives initial values of means for each mode "m=guess(:,1)", standard deviation "sq=guess(:,2)" and distribution of modes "p=guess(:,3)" with default values: (1) m to be "M" numbers equally spaced between minimum and maximum of data; (2) sq to be "M" numbers equal to the standard deviations of the data; and (3) p to be "M" numbers equal to 1/M. At step 710, the computing system calculates several iterations of the following until either "check"<"epsilon" or "count">"Maxcount." Each iteration includes calculating: w which is a table with M rows and D columns, where row number "k" is equal to the values of the density of the normal distribution with parameters m(k) and sq(k) at points of the data. Then "w" is renormalized a couple of times (e.g., two or three times): (1) each row "k" is multiplied by "p(k)", i.e., w(k,d):=w(k,d)*p(k); and (2) then each column is divided by its sum, i.e., w(k,d):=w(k,d)/sum_k (w(k,d)). At step 720, the computing system updates "m", "sq" and "p" as follows: (1) new "p" is calculated (i.e., the vector p is updated) by summing the rows: p(m)=sum_d(w (k,d)); and (2) new "m" and "sq" are calculated as weighted means and standard deviations of data, where weights are the rows of w(k,d)/p(k). At step 730, a "count" is increased by 1 (to see if the calculation did not exceed the Maxcount of number of iterations) and "check" is calculated, e.g., as the sum of Euclidean distances of previous "m" and "updated m" and/or previous "sq" and "updated sq" and/or previous "p" and "updated p." A smaller "check" value indicates a less number of updates on "m", "sq" and "p". Then, the computing system performs another iteration as control goes back to step 710. As an output, the computing system generates a table of w(m,d) which indicates for each data(d) the probabilities of this data point coming from the normal distribution (mode) k, for all d=1, . . . D and k=1, . . . M together with parameters of this normal distributions and information of how the iterations stopped.

This exemplary algorithm further assigns each data a distribution mode (with highest probability) and hence separates the data into subsets. In one embodiment, the data are Q-time correlations. Once the computing system collected the correlations into subsets, the computing system can again analyze the meaning (e.g., Q-times, correlation coefficients, etc.) of each subset to improve semiconductor product quality (e.g., reduced leakage current in semiconductor products).

Returning to FIG. 1, at step 140, the processor extracts semiconductor manufacturing process steps belonging to the groups of similar dependencies. For example, distinctive groups (e.g., groups 400-450 in FIG. 4) are visible due to the multi-modal characteristic of the dependency table(s). In a dependency table (e.g., the table 460 in FIG. 4), groups (e.g., groups 400-420 and 450 in FIG. 4) close to diagonal (e.g., a line 495 in FIG. 4) represent Q-time correlation(s) of consecutive (semiconductor manufacturing process) steps. Groups (e.g., groups 430 and 440 in FIG. 4) off the diagonal represent Q-time correlation(s) of separate (semiconductor manufacturing process) steps. The processor may provide data (e.g., Q-times, correlation coefficients, etc.) pertaining to these groups (e.g., groups 400-450 in FIG. 4) to a user for further analysis of common physical influence on semiconductor products and/or of common machine or subtract features. In one embodiment, the processor extracts the semiconductor manufacturing steps in a particular group (e.g., a group 400 in FIG. 4), e.g., by referencing to the first table and/or the second table.

Figure 2:
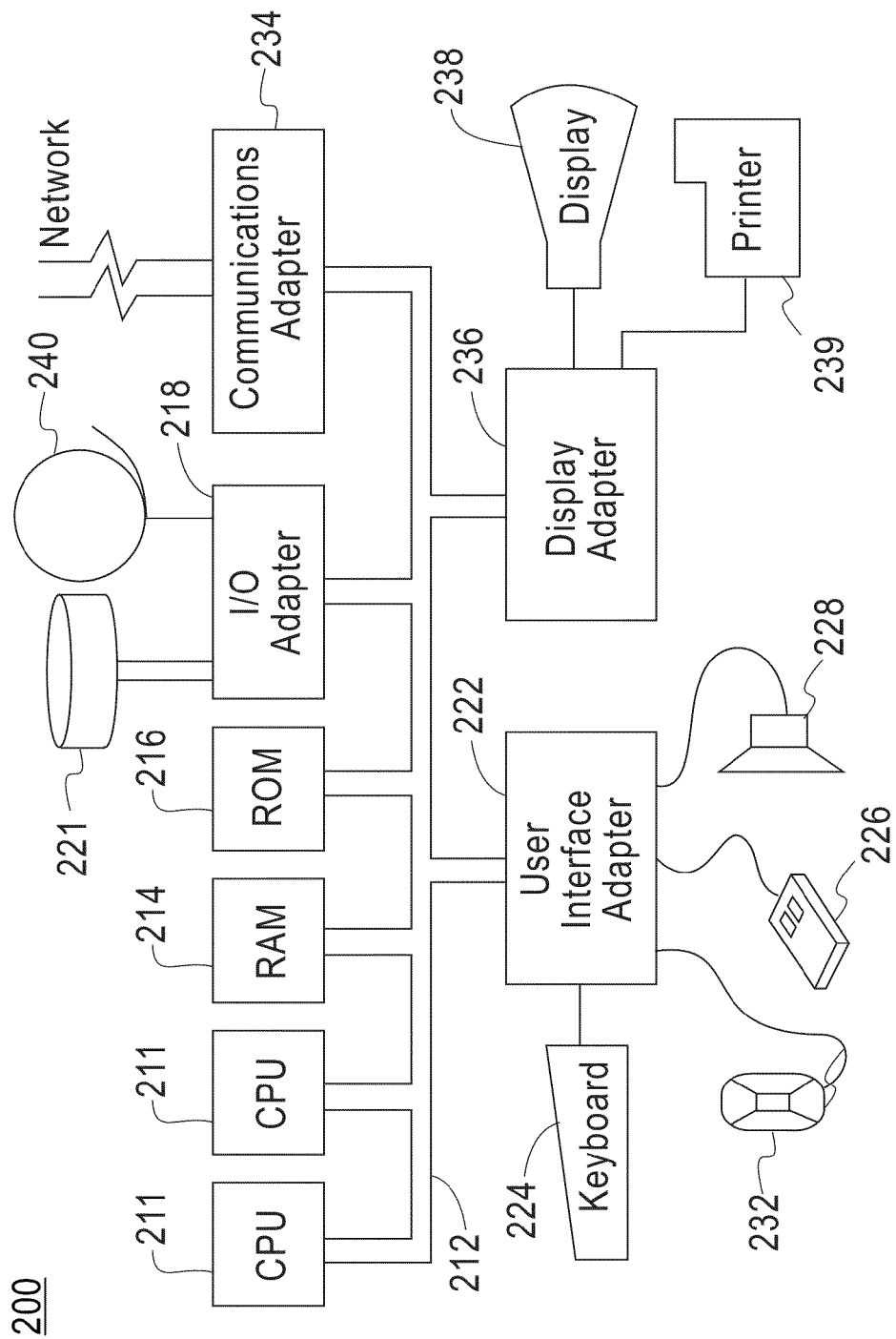
FIG. 2 illustrates an exemplary hardware configuration for implementing the flow chart depicted in FIG. 1 according to one embodiment.

FIG. 2 illustrates an exemplary hardware configuration of a computing system 200 running and/or implementing the method steps in FIG. 1. The hardware configuration preferably has at least one processor or central processing unit (CPU) 211. The CPUs 211 are interconnected via a system bus 212 to a random access memory (RAM) 214, read-only memory (ROM) 216, input/output (I/O) adapter 218 (for connecting peripheral devices such as disk units 221 and tape drives 240 to the bus 212), user interface adapter 222 (for connecting a keyboard 224, mouse 226, speaker 228, microphone 232, and/or other user interface device to the bus 212), a communication adapter 234 for connecting the system 200 to a data processing network, the Internet, an Intranet, a local area network (LAN), etc., and a display adapter 236 for connecting the bus 212 to a display device 238 and/or printer 239 (e.g., a digital printer of the like).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list)

of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with a system, apparatus, or device running an instruction.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for determining a group of semiconductor manufacturing process steps that have a similar influence on individual semiconductor products, the method comprising:
    obtaining a first table including time stamps of the manufacturing process steps for the individual semiconductor products;
    creating a second table including Q-times based on the first table, the Q-times referring to time differences between every pair of the time stamps;
    forming a dependency table by grouping the Q-times with similar dependencies together;
    identifying groups of the similar dependencies; and
    extracting semiconductor process steps belonging to the groups,
    wherein a processor coupled to a memory device is configured to perform: the obtaining, the creating, the forming, the identifying and the extracting.

2. The method according to claim 1, wherein the dependency table includes one of: a graph or histogram of a distribution of a correlation having at least two distinct maxima.

3. The method according to claim 2, wherein the identifying comprises:
    clustering the Q-times into the groups of similar dependency measures.

4. The method according to claim 3, wherein the similar dependency measures include similar correlation coefficients.

5. The method according to claim 3, wherein the clustering uses a splitting algorithm.

6. The method according to claim 3, wherein the clustering reduces data to be analyzed to subsets of the data by isolating the groups of the semiconductor process steps with the similar dependencies.

7. The method according to claim 6, further comprising:
    investigating the isolated groups in order to determine a physical cause of a change in characteristics of the semiconductor products.

8. The method according to claim 7, wherein the dependencies include correlations between the groups of the Q-times with the characteristics of the semiconductor products.

9. The method according to claim 8, wherein groups close to a diagonal of the graph or histogram represent correlations of consecutive semiconductor manufacturing process steps.

10. The method according to claim 9, wherein groups off the diagonal of the graph or histogram represents correlations of separate semiconductor manufacturing process steps.

11. The method according to claim 8, wherein the dependency table comprises:
    independent samples whose correlation coefficients have unimodal distributions; and
    dependent samples whose shapes change toward heavier or lighter tails.

12. The method according to claim 11, wherein the unimodal distributions is close to Gaussian distribution.

13. A system for determining a group of semiconductor manufacturing process steps that have a similar influence on individual semiconductor products, the system comprising:
    a memory device; and
    a processor being connected to the memory device,
    wherein the processor performs steps of:
        obtaining a first table including time stamps of the manufacturing process steps for the individual semiconductor products;
        creating a second table including Q-times based on the first table, the Q-times referring to time differences between every pair of the time stamps;
        forming a dependency table by grouping the Q-times with similar dependencies together;
        identifying groups of the similar dependencies; and
        extracting semiconductor process steps belonging to the groups.

14. The system according to claim 13, wherein the dependency table includes one of:
    a graph or histogram of a distribution of a correlation having at least two distinct maxima.

15. The system according to claim 14, wherein the identifying comprises:
    clustering the Q-times into the groups of similar dependency measures.

16. The system according to claim 15, wherein the similar dependency measures include similar correlation coefficients.

17. The system according to claim 15, wherein the clustering uses a splitting algorithm.

18. The system according to claim 15, wherein the clustering reduces data to be analyzed to subsets of the data by isolating the groups of the semiconductor process steps with the similar dependencies.

19. The system according to claim 18, wherein the processor further performs:
    investigating the isolated groups in order to determine a physical cause of a change in characteristics of the semiconductor products.

20. The system according to claim 19, wherein the dependencies include correlations between the groups of the Q-times with the characteristics of the semiconductor products.

21. The system according to claim 20, wherein groups close to a diagonal of the graph or histogram represent correlations of consecutive semiconductor manufacturing process steps.

22. The system according to claim 21, wherein groups off the diagonal of the graph or histogram represents correlations of separate semiconductor manufacturing process steps.

23. The system according to claim 19, wherein the dependency table comprises:
    independent samples whose correlation coefficients have unimodal distributions; and
    dependent samples whose shapes change toward heavier or lighter tails.

24. The system according to claim 23, wherein the unimodal distributions is close to Gaussian distribution.

25. A computer program product for determining a group of semiconductor manufacturing process steps with a similar influence on individual semiconductor products, the computer program product comprising a non-transitory computer-readable storage medium readable by a processing circuit and storing instructions run by the processing circuit for performing a method, the method comprising:
    generating a first table including time stamps for the individual semiconductor products;
    creating a second table including Q-times based on the first table, the Q-times referring to time differences between every pair of the time stamps;
    forming a dependency table by grouping the Q-times with similar dependencies together;
    identifying groups of the similar dependencies; and
    extracting semiconductor process steps belonging to the groups.

* * * * *